United States Patent [19]

Yatagai et al.

[11] Patent Number: 4,983,710

[45] Date of Patent: Jan. 8, 1991

[54] METHOD FOR PRODUCTION OF METHYLOLAMINOTRIAZINE CONDENSATES BASED ON CYCLOHEXANECARBOGUANAMINE

[75] Inventors: Hidetaka Yatagai, Nishinomiya; Jiro Iriguchi, Takatsuki; Souichi Yamada, Kyoto; Tsuguo Takaya, Otsu, all of Japan

[73] Assignee: Nippon Shokubai Kagaku Kogyo Co., Ltd., Osaka, Japan

[21] Appl. No.: 391,956

[22] Filed: Aug. 10, 1989

Related U.S. Application Data

[63] Continuation-in-part of Ser. No. 195,153, May 18, 1988, abandoned.

[30] Foreign Application Priority Data

May 20, 1987 [JP] Japan .................................. 62-121338
Jul. 30, 1987 [JP] Japan .................................. 62-188992
Oct. 30, 1987 [JP] Japan .................................. 62-273271

[51] Int. Cl.$^5$ .............................................. C08G 12/30
[52] U.S. Cl. ....................................................... 528/258
[58] Field of Search .......................................... 528/258

[56] References Cited

U.S. PATENT DOCUMENTS 2,761,779  9/1956  Lindenfelser ........................ 528/258
2,859,188 11/1958  Helder et al. ........................ 528/258
3,379,661  4/1968  Gynn et al. ........................... 528/258

FOREIGN PATENT DOCUMENTS 1071336 12/1959  Fed. Rep. of Germany .
40-2353   2/1965  Japan .
41-223    1/1966  Japan .
49-5469   1/1974  Japan .
48-17756  1/1974  Japan .

OTHER PUBLICATIONS

Chemical Abstracts vol. 80, No. 24, Jun. 17, 1974, p. 29, Abstract No. 134205f.

Primary Examiner—John Kight, III
Assistant Examiner—Frederick Krass
Attorney, Agent, or Firm—Burns, Doane, Swecker & Mathis

[57] ABSTRACT

A method for the production of methylolaminotriazine condensate by the reaction of cyclohexanecarboguanamine (A) and formaldehyde (B), which method comprises preparing a solution of formaldehyde (B) or a solution containing cyclohexanecarboguanamine (A) and formaldehyde (B) in such amounts that the molar ratio of (A)/(B) will be not more than 1/2.5, keeping the temperature of said solution in the range of 55° to 150° C. and, at the same time, gradually supplying cyclohexanecarboguanaimine (A) thereto.

4 Claims, No Drawings

METHOD FOR PRODUCTION OF METHYLOLAMINOTRIAZINE CONDENSATES BASED ON CYCLOHEXANECARBOGUANAMINE

This is a continuation-in-part of application Ser. No. 195,153, filed May 18, 1988, which is to be abandoned.

BACKGROUND OF THE INVENTION

1. Field of the Invention

This invention relates to a method for the production of a methylolaminotriazine condensate, the reaction product of cyclohexanecarboguanamine with formaldehyde. More particularly, it relates to a method for highly efficient production of methylolaminotriazine condensate capable of being thoroughly dissolved in such solvents as water, methanol, butanol, and mixtures thereof and consequently giving rise to a homogeneous solution even when the ratio of the amount of formaldehyde to be used to the amount of cyclohexanecarboguanamine is small.

2. Description of the Prior Art

The methylolaminotriazine condensate produced by the reaction of cyclohexanecarboguanamine with formaldehyde has been known to the art. This methylolaminotriazine condensate as used in a shaped article, for example, excels the condensate using melamine in crack resistance and excels the condensate using benzoguanamine in lightfastness and promises a great expansion of the range of uses found therefor.

A method for the production of methylolaminotriazine condensate (hereinafter refeferred to as "CHG resin") by the reaction of cyclohexanecarboguanamine with formaldehyde is described in Japanese Patent Publication SHO 48(1973)-17,756. Specifically, the technique of causing cyclohexanecarboguanamine to react with formaldehyde in an aqueous solution at a temperature in the range of 40° to 80° C. is disclosed in this patent publication. This method is very effective when formaldehyde is used in a large amount. This method, however, has betrayed a disadvantage that when the amount of formaldehyde to be used is decreased to less than 3 mols, particularly to less than 2.5 mols, per mol of cyclohexanecarboguanamine the reaction mixture consequently obtained is turbid and does not form a homogeneous solution.

This phenomenon is peculiar to the CHG resin and is not observed in melamine-, benzoguanamine-, or norbornanecarboguanamine. U.S. Pat. No. 3,379,661 discloses a method for the production of a copolycondensate resin of cyclohexanecarboguanamine and melamine. This copolycondensate resin produces a homogeneous resin solution even when the amount of formaldehyde to be used is less than 3 mols per mol of the total of cyclohexanecarboguanamine and melamine.

A method for the production of the CHG resin by the reaction of cyclohexanecarboguanamine with formaldehyde and an alcohol is described in U.S. Pat. No. 2,859,188. Specifically, the technique of causing 1 mol of cyclohexanecarboguanamine to react with 3 to 6 mols of formaldehyde in a mixed solvent of alcohol and water, with the solution kept refluxed, is disclosed. This method also has a disadvantage that when formaldehyde is used in an amount of less than 3 mols per mol of cyclohexanecarboguanamine, the solution consequently obtained is turbid and cannot be used as a raw material for coating material.

For the conventional techniques to produce a homogeneous CHG resin, it is essential that formaldehyde should be used in an amount of not less than 3 mols per mol of cyclohexanecarboguanamine. In the light of the toxicity of formaldehyde, the use of formaldehyde in such a large amount is sometimes undesirable depending on the use of CHG resin thus obtained. In this respect, the conventional techniques have room for further improvement.

An object of this invention, therefore, is to provide a method for producing a clear and homogeneous CHG resin even when formaldehyde is used in an amount of less than 3 mols per mol of cyclohexanecarboguanamine.

SUMMARY OF THE INVENTION

In the production of methylolaminotriazine condensate by the reaction of cyclohexanecarboguanamine (A) with formaldehyde (B), the object mentioned above is accomplished by a method which comprises preparing a solution of formaldehyde (B) or a solution containing cyclohexanecarboguanamine (A) and formaldehyde (B) in a molar (A)/(B) ratio of not more than 1/2.5 and keeping the temperature of the solution in the range of 55° to 150° C. and, at the same time, gradually supplying cyclohexanecarboguanamine (A) to the solution for reaction therewith.

By the method of the present invention, a homogeneous and clear CHG resin free from turbidity can be obtained even when the amount of formaldehyde (B) to be used is less than 3 mols per mol of cyclohexanecarboguanamine (A). The CHG resin obtained by this method is highly suitable, decorative plywood, and coating material which are sheet, decorative plywood, and coating material which are generally found for the aminotriazine resin.

EXPLANATION OF THE PREFERRED EMBODIMENT

We have made a diligent study in search of the cause for the turbidity observed in the CHG resin solution when the amount of formaldehyde (B) to be used is less than 3 mols per mol of cyclohexanecarboguanamine (A) in the production of the CHG resin solution, to find that monomethylolcyclohexanecarboguanamine, a 1:1 (molar ratio) addition dehydrate of cyclohexanecarboguanamine (A) and formaldehyde (B), exhibits very low solubility in such solvents as water and alcohols and that the CHG resin in the presence of a large amount of this monomethylolcyclohexanecarboguanamine is opacified with precipitated matter and the precipitated matter once formed is not eliminated by pH adjustment or addition of formaldehyde (B). For the CHG resin to be produced in a homogeneous and clear constitution free from turbidity even when the amount of formaldehyde (B) to be used is less than 3 mols per mol of cyclohexanecarboguanamine (A), therefore, [it is essential that the retention of monomethylolcyclohexanecarboguanamine in the reaction mixture should be inhibited.]

In the present invention, the gradual supply of cyclohexanecarboguanamine (A) is significant in respect that when the gradual supply of cyclohexanecarboguanamine (A) is made simultaneously with the progress of the reaction of condensation, the retention of monomethylolcyclohexanecarboguanamine can be inhibited.

Since the speed of the gradual supply is allowed to be high where the reaction of condensation quickly proceeds, the temperature of the solution generally falls in the range of 55° to 150° C. Particularly this temperature range is 80° to 150° C. where the amount of formaldehyde (B) to be used is in the range of 1.8 to 3 mols per mol of cyclohexanecarboguanamine (A).

The speed of the gradual supply of cyclohexanecarboguanamine (A) is required to be such as to attain required inhibition of the retention of monomethylolcyclohexanecarboguanamine at a temperature in the range mentioned above. It is preferable to satisfy the following formula:

$$Y \geq 100(1/X - \tfrac{1}{3}) \qquad (I)$$

wherein X is the number of mols of formaldehyde (B) to be used per mol of cyclohexanecarboguanamine (A) and Y is the number of minutes of the gradual supply of cyclohexanecarboguanamine (A) after the temperature of the solution reaches 80° C.

In the gradual supply of cyclohexanecarboguanamine (A), this compound may be used for the gradual supply in the whole amount required for the reaction or part of the compound may be incorporated in the initial mixture of reactants, but when the part of the compound is incorporated in the initial mixture, the amounts of cyclohexanecarboguanamine (A) and formaldehyde (B) incorporated in the initial mixture of reactants are preferable such that the molar (A)/(B) ratio will be not more than 1/2.5, preferably not more than 1/3.

Further, for the purpose of its gradual supply, this cyclohexanecarboguanamine (A) may be prepared, when necessary, in the form of a slurry obtained by mixture thereof with the solvent to be used in the reaction. In this case, the solvent may contain formaldehyde (B).

The solvent for use in the reaction is preferable to be at least one member selected from the group consisting of water and alcohols. The alcohols which are usable herein include aliphatic alcohols such as methanol, ethanol, n-propanol, isopropanol, butanols, hexanols, and octanols, alicyclic alcohols such as cyclohexanol and cyclooctanol, ether alcohols such as ethylene glycol monomethyl ether, ethylene glycol monoethyl ether, and ethylene glycol monobutyl ether, and ketone alcohols such as diacetone alcohol. Among other alcohols mentioned above, aliphatic alcohols of 1 to 8 carbon atoms, especially aliphatic alcohols of 1 to 4 carbon atoms, prove to be particularly preferable.

The formaldehyde (B) is used for the reaction in an amount generally in the range of 1.8 to 10 mols, preferably 1.8 to 5 mols, per mol of cyclohexanecarboguanamine (A). The effect of this invention is manifested most conspicuously when this amount falls in the range of 1.8 to 3 mols.

Now, this invention will be described more specifically below with reference to working examples.

EXAMPLE 1

In a four-neck flask having an inner volume of 100 ml and provided with a thermometer, a reflux condenser, and a stirrer, 15.9 g (82 m.mols) of cyclohexanecarboguanamine (A) and 20.0 g [247 m.mols: 3 mols per mol of cyclohexanecarboguanamine (A)] of an aqueous 37 wt% formaldehyde solution were placed, with the pH value of the mixture of reactants adjusted to 8, stirred and heated in a refluxed state (liquid temperature 94° C.).

Immediately after the reflux started, 3.2 g (17 m.mols) of cyclohexanecarboguanamine (A) was added to the reaction mixture and the stirring under the reflux was further continued. After 15 minutes and 30 minutes following the addition of cyclohexanecarboguanamine, 3.2 g of cyclohexanecarboguanamine (A) was added each. The total amount of cyclohexanecarboguanamine (A) used for the reaction was 25.5 g (132 m.mols). Thus, the molar ratio of cyclohexanecarboguanamine (A) to formaldehyde (b) is 1: 1.87.

The stirring under the reflux was continued for two hours after the addition of cyclohexanecarboguanamine (A) was completed. The resultant mixture was distilled under normal pressure to expel water and the unaltered formaldehyde (B). It was further heated up to 120° C. to effect removal of the remaining water and unaltered formaldehyde to obtain a solid CHG resin. The resin thus obtained was transparent and homogeneous.

EXAMPLE 2

A clear and homogeneous resin was obtained by repeating the procedure of Example 1, except that the amount of cyclohexanecarboguanamine (A) added immediately after the start of the reflux was changed to 8.0 g (41 m.mols) and this addition was made over a period of 20 minutes following the start of the reflux. The total amount of cyclohexanecarboguanamine (A) used for the reaction was 23.9 g (124 m.mols). Thus, the molar ratio of cyclohexanecarboguanamine (A) to formaldehyde (B) was 1:2.

EXAMPLE 3

When the procedure of Example 2 was repeated, except that the time for the gradual supply of cyclohexanecarboguanamine (A) after the start of the reflux was changed to 10 minutes, the produced resin was observed to be slightly opacified with precipitated matter.

EXAMPLE 4

In a four-neck flask having an inner volume of 100 ml and provided with a thermometer, a reflux condenser, and a stirrer, 15.9 g (82 m.mols) of cyclohexanecarboguanamine (A), 9.3 g (248 m.mols) of 80% by weight of paraformaldehyde, and 50 g of normal butanol were placed and, with the pH value of the mixture of reactants adjusted to 8, stirred and heated at 100° C.

After the temperature of the reaction mixture reached 80° C., it rose to 100° C. in 5 minutes. Immediately after the temperature reached 100° C., 2.6 g (13 m.mols) of cyclohexanecarboguanamine (A) was added to the reaction mixture. Then, the stirring was continued at 100° C. After 10 minutes and 20 minutes following the addition, 2.6 g of cyclohexanecarboguanamine (A) was added each. The total amount of cyclohexanecarboguanamine (A) used for the reaction was 23.7 g (123 m.mols). Thus the molar ratio of cyclohexanecarboguanamine (A) to formaldehyde (B) used in the reaction was 1:2.

Then, the stirring was continued at 100° C. for 30 minutes. The reaction mixture was distilled under a vacuum at 100° C. to expel the unaltered formaldehyde and normal butanol and obtain a clear and homogeneous CHG resin solution having a resin concentration of 60% by weight.

CONTROL 1

In a four-neck flask having an inner volume of 100 ml and provided with a thermometer, a reflux condenser, and a stirrer, 23.9 g (124 m.mols) of cyclohexanecarboguanamine (A) and 20.0 g [247 m.mols: 2 mols per mol of cyclohexanecarboguanamine (A)] of an aqueous 37 wt% formaldehyde solution were placed and, with the pH value of the mixture of reactants adjusted to 8, stirred and heated in the refluxed state.

The reaction solution became clear and homogeneous at 75° C. After 30 minutes following the start of the reflux, the reaction began to educe monomethylolcyclohexanecarboguanamine crystals and then opacified and foamed.

What is claimed is:

1. A method for the production of a homogenous and clear methylolaminotriazine condensate by the reaction of cyclohexanecarboguanamine (A) and formaldehyde (B), which method comprises:

preparing a solution of formaldehyde (B) or a solution containing cyclohexanecarboguanamine (A) and formaldehyde (B) in such amounts that the molar ratio (A)/(B) will be not more than about 1/2.5;

heating the solution and maintaining the temperature of the solution between about 80° and about 150° C. and;

supplying cyclohexanecarboguanamine to the solution at a rate defined by the formula:

$$Y \geq 100(1/X - \frac{1}{3})$$

wherein X is the number of moles of formaldehyde to be used per mole of cyclohexanecarboguanamine, said number of moles of formaldehyde being from about 1.8 to less than about 3, and Y is the time in minutes during which said cyclohexanecarboguanamine is added to the solution after the temperature of said solution reaches about 80° C.

2. A method for the production of a homogeneous and clear methylolaminotriazine condensate by the reaction of cyclohexanecarboguanamine (A) and formaldehyde (B), which method comprises:

preparing a solution of formaldehyde (B) or a solution containing cyclohexanecarboguanamine (A) and formaldehyde (B) in such amounts that the molar ratio (A)/(B) will be not more than about 1/2.5;

heating the solution and maintaining the temperature of the solution between about 55° C. and about 150° C., and;

supplying cyclohexanecarboguanamine to the solution at a rate below that resulting in the retention of monomethylolcyclohexanecarboguanamine in amounts sufficient to cause turbidity of one solution.

3. A method according to claim 1, wherein the solvent for said solution is at least one member selected from the group consisting of water and alcohols.

4. A method according to claim 1, wherein the solvent for said solution is at least one member selected from the group consisting of water and aliphatic alcohols of 1 to 8 carbon atoms.

* * * * *